United States Patent [19]
Farrand et al.

[11] 3,718,678
[45] Feb. 27, 1973

[54] 1-(α-CYANOMETHYLENE-HYDRAZINO)-PHENOXY-3-AMINOPROPAN-2-OLS

[75] Inventors: Roy Farrand; Roy Hull, both of Macclesfield, England

[73] Assignee: Imperial Chemical Industries Limited, London, England

[22] Filed: Oct. 27, 1969

[21] Appl. No.: 869,923

[30] Foreign Application Priority Data

Nov. 12, 1968 Great Britain.....................53,612/68

[52] U.S. Cl..............260/465 D, 260/79.3, 260/192, 260/256.4 R, 260/348 A, 260/348 R, 260/465 E, 260/471 R, 260/501.17, 260/559 A, 260/566 B, 260/570.7, 424/254, 424/304, 424/309, 424/316, 424/324, 424/330

[51] Int. Cl............................................C07c 121/78

[58] Field of Search........................260/465 D, 465 E

[56] References Cited

UNITED STATES PATENTS 3,459,782   8/1969   Koppe et al. .........................260/465

Primary Examiner—Lewis Gotts
Assistant Examiner—Dolph H. Torrence
Attorney—Cushman, Darby & Cushman

[57] ABSTRACT

The disclosure relates to 1-amino-3-(hydrazinophenoxy)-2-propanol derivatives, processes for their manufacture, pharmaceutical compositions containing them and a method of using them to produce cardiac β-blockade in warm-blooded animals. Representative of the compounds disclosed is 1-p-(α-cyano-α-ethoxycarbonylmethylenehydrazino)phenoxy-3-isopropylaminopropan-2-ol.

12 Claims, No Drawings

1-(α-CYANOMETHYLENE-HYDRAZINO)-PHENOXY-3-AMINOPROPAN-2-OLS

This invention relates to new alkanolamine derivatives which possess β-adrenergic blocking activity and which are therefore useful in the treatment or prophylaxis of heart diseases, for example angina pectoris and cardiac arrhythmias, and in the treatment of hypertension and phaeochromocytoma, in man.

According to the invention we provide new alkanolamine derivatives of the formula:

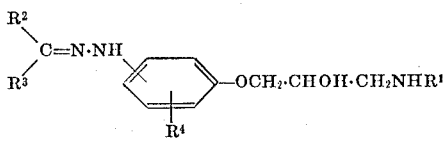

wherein $R^1$ stands for an alkyl, hydroxyalkyl or cycloalkyl radical, wherein $R^2$ stands for an alkyl or acyl radical, or for a functional derivative of the carboxy radical, and $R^3$ stands for an acyl or nitro radical, or for a functional derivative of the carboxy radical, or wherein $R^2$ and $R^3$ together with the adjacent carbon atom form a homocyclic or heterocyclic ring of which at least one of the groups next to the said adjacent carbon atom is a carbonyl radical; and wherein $R^4$ stands for hydrogen or for a halogen atom or for an alkyl, cycloalkyl, alkenyl, nitro, alkylthio, alkoxy, alkenyloxy, alkynyloxy, aryl, aryloxy, aralkyl, aralkoxy, hydroxyalkyl, alkoxyalkyl, halogenoalkyl, acyl, alkoxycarbonyl or cyano radical; and the acid-addition salts thereof.

It is to be understood that the above definition of alkanolamine derivatives encompasses all possible stereoisomers thereof, and mixtures thereof.

As a suitable value for $R^1$ when it stands for an alkyl or hydroxyalkyl radical, there may be mentioned, for example, an alkyl or hydroxyalkyl radical each of up to 12 carbon atoms and particularly of three, four or five carbon atoms, which preferably is branched at the α-carbon atom, for example the isopropyl, s-butyl, t-butyl or 2-hydroxy-1,1-dimethylethyl radical.

As a suitable value for $R^1$ or $R^4$ when it stands for a cycloalkyl radical there may be mentioned, for example, a cycloalkyl radical of up to 8 carbon atoms, for example the cyclopropyl, cyclobutyl or cyclopentyl radical.

As a suitable value for $R^2$ or $R^4$ when it stands for an alkyl radical there may be mentioned, for example, an alkyl radical of up to four carbon atoms, for example the methyl or ethyl radical.

As a suitable value for $R^2$ or $R^3$ when it stands for an acyl radical there may be mentioned, for example, an alkanoyl radical of up to six carbon atoms, for example the acetyl or propionyl radical, or an aroyl radical of up to 10 carbon atoms, for example the benzoyl or p-toluoyl radical.

As a suitable value for $R^2$ or $R^3$ when it stands for a functional derivative of the carboxy radical there may be mentioned, for example, the cyano radical; or an alkoxycarbonyl radical, for example an alkoxycarbonyl radical of up to six carbon atoms, for example the methoxycarbonyl, ethoxycarbonyl or t-butoxycarbonyl radical; or the carbamoyl radical; or the carbazoyl radical.

As a suitable value for the homocyclic or heterocyclic ring formed by $R^2$, $R^3$ and the adjacent carbon atom there may be mentioned, for example, such a ring of five or six ring atoms, for example the 2,5-dioxocyclopentylidene or 2,6-dioxocyclohexylidene radical, or the hexahydro-2,4,6-trioxopyrimidine-5-ylidene radical.

As a suitable value for $R^4$ when it stands for a halogen atom there may be mentioned, for example, the fluorine, chlorine, bromine or iodine atom.

As a suitable value for $R^4$ when it stands for an alkenyl radical there may be mentioned, for example, an alkenyl radical of up to 6 carbon atoms, for example the allyl radical.

As a suitable value for $R^4$ when it stands for an alkylthio or alkoxy radical there may be mentioned, for example, an alkylthio or alkoxy radical of up to five carbon atoms, for example the methylthio, methoxy or isopropoxy radical.

As a suitable value for $R^4$ when it stands for an alkenyloxy or alkynyloxy radical there may be mentioned, for example, an alkenyloxy or alkynyloxy radidal of up to five carbon atoms, for example the allyloxy or propargyloxy radical.

As a suitable value for $R^4$ when it stands for an aryl or aryloxy radical there may be mentioned, for example, an aryl or aryloxy radical of up to 10 carbon atoms, for example the phenyl or phenoxy radical.

As a suitable value for $R^4$ when it stands for an aralkyl or aralkoxy radical there may be mentioned, for example, an aralkyl or aralkoxy radical of up to 10 carbon atoms, for example the benzyl, α-phenylethyl or benzyloxy radical.

As a suitable value for $R^4$ when it stands for a hydroxyalkyl, alkoxyalkyl or halogenoalkyl radical there may be mentioned, for example, an alkyl radical of up to five carbon atoms which is substituted by one or more hydroxy radicals, alkoxy radicals of up to four carbon atoms or halogen atoms, for example the hydroxymethyl, methoxymethyl or trifluoromethyl radical.

As a suitable value for $R^4$ when it stands for an acyl or alkoxycarbonyl radical there may be mentioned, for example, an acyl or alkoxycarbonyl radical of up to six carbon atoms, for example the acetyl, propionyl, methoxycarbonyl or ethoxycarbonyl radical.

As suitable acid-addition salts of the alkanolamine derivatives of the invention, there may be mentioned, for example, salts derived from inorganic acids, for example hydrochlorides, hydrobromides, phosphates or sulphates, or salts derived from organic acids, for example oxalates, lactates, tartrates, acetates, salicylates, citrates, benzoates, β-naphthoates, adipates or 1,1-methylene-bis-(2-hydroxy-3-naphthoates), or salts derived from acidic synthetic resins, for example sulphonated polystyrene resins, for example "Zeo-Karb" 225 ("Zeo-Karb" is a Trade Mark).

A preferred group of alkanolamine derivatives of the invention comprises compounds of the formula:

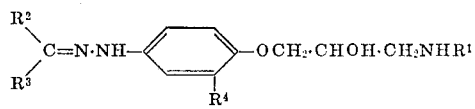

wherein $R^1$, $R^2$, $R^3$ and $R^4$ have the meanings stated above, and the acid-addition salts thereof, and of these, particularly preferred compounds have the abovementioned formula wherein $R^1$ stands for the isopropyl, s-butyl, t-butyl or 2-hydroxy-1,1-dimethylethyl radical, $R^2$ stands for the acetyl, cyano, carbamoyl or carbazoyl radical or an alkoxycarbonyl radical of up to six carbon atoms, $R^3$ stands for the acetyl, cyano, carbamoyl or carbazoyl radical or an alkoxycarbonyl radical of up to six carbon atoms, and $R^4$ stands for hydrogen, chlorine or the ethyl radical, and the acid-addition salts thereof.

Specific alkanolamine derivatives of the invention are 1-p-($\alpha,\alpha$-bisethoxycarbonylmethylenehydrazino) phenoxy-3-isopropylaminopropan-2-ol; 1-p-($\alpha,\alpha$-bisethoxycarbonylmethylenehydrazino)-phenoxy-3-t-butylaminopropan-2-ol; 1-p-($\alpha$-cyano-$\alpha$-ethoxycarbonylmethylenehydrazino)phenoxy-3-isopropylaminopropan-2-ol; 1-p-($\alpha,\alpha$-dicyanomethylenehydrazino)phenoxy-3-isopropylaminopropan-2-ol; 1-p-($\alpha,\alpha$-diacetyl-methylenehydrazino)phenoxy-3-isopropylaminopropan-2-ol; 1-p-($\alpha$-carbamoyl-$\alpha$-cyanomethylenehydrazino)phenoxy-3-isopropylaminopropan-2-ol; 1-p-($\alpha,\alpha$-dicarbazoyl-methylenehydrazino)-phenoxy-3-isopropylaminopropan-2-ol; 1-[4-($\alpha,\alpha$-bisethoxycarbonyl-methylenehydrazino)-2-ethyl]phenoxy-3-t-butylaminopropan-2-ol; 1-p-($\alpha$-acetyl-$\alpha$-methoxycarbonylmethylenehydrazino)phenoxy-3-isopropylaminopropan- 2-ol; 1-p-(4,4-dimethyl-2,6-dioxocyclohexylidenehydrazino)phenoxy-3-isopropylaminopropan-2-ol; 1-p-($\alpha$-cyano-$\alpha$-t-butoxycarbonylmethylenehydrazino)phenoxy-3-isopropylaminopropan-2-ol; 1-p-($\alpha$-nitroethylidenehydrazino)phenoxy-3-isopropylaminopropan-2-ol; 1-p-($\alpha$-cyano-$\alpha$-ethoxycarbonylmethylenehydrazino)phenoxy-3-(2-hydroxy-1,1-dimethylethylamino)propan-2-ol; 1-p-($\alpha$-acetyl-$\alpha$-benzoyl-methylenehydrazino)phenoxy-3-isopropylaminopropan-2-ol; 1-[2-chloro-4-($\alpha$-cyano-$\alpha$-ethoxycarbonylmethylenehydrazino)phenoxy]-3-isopropyl-aminopropan-2-ol; 1-p-($\alpha$-carbamoyl-$\alpha$-ethoxycarbonylmethylene-hydrazino)phenoxy-3-isopropylaminopropan-2-ol and 1-p-($\alpha$-cyano-$\alpha$-methoxycarbonylmethylenehydrazino)phenoxy-3-isopropylaminopropan-2-ol; and the acid-addition salts thereof.

According to a further feature of the invention we provide a process for the manufacture of the alkanolamine derivatives of the invention which comprises the diazotisation of an amino compound of the formula:

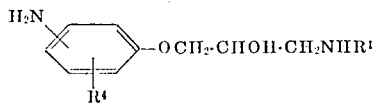

wherein $R^1$ and $R^4$ have the meanings stated above, followed by the interaction of the diazo compound thus obtained and a compound of the formula $R^2CH_2R^3$, wherein $R^2$ and $R^3$ have the meanings stated above, whereafter if desired the product in free base form is converted into an acid-addition salt thereof by reaction with an acid.

The diazotisation may be carried out by conventional means, for example by the interaction of the amino compound and nitrous acid under cold aqueous conditions. The interaction of the diazo compound and the compound of the formula $R^2CH_2R^3$ may be carried out in a diluent or solvent, for example water, aqueous ethanol or methanol, and it may be carried out at a low temperature, for example at a temperature of between −5° and +10°C. The latter interaction may also be carried out in the presence of a base, for example sodium acetate, sodium carbonate or sodium methoxide.

The amino compound used as starting material for the above interaction may be obtained, for example, by the reduction of the corresponding nitro compound, or by the hydrolysis of the corresponding acylamino compound. Suitable acylamino compounds are described in United Kingdom Patent Specification No. 1,078,852 and in co-pending United Kingdom Applications Nos. 49368/66, 49369/66, 40961/67 and 43927/67, to which Dutch Specifications Nos. 6714892, 6714894, 6812681 and 6813616 respectively correspond.

According to a further feature of the invention we provide a process for the manufacture of the alkanolamine derivatives of the invention which comprises the interaction of a compound of the formula:

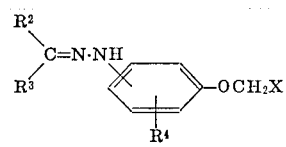

wherein $R^2$, $R^3$ and $R^4$ have the meanings stated above, and wherein X stands for the group

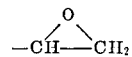

or the group $-CHOH \cdot CH_2Y$, wherein Y stands for a halogen atom, or of mixtures of such compounds wherein X has both meanings stated above, with an amine of the formula $NH_2R^1$, wherein $R^1$ has the meaning stated above, whereafter if desired the product in free base form is converted into an acid-addition salt thereof by reaction with an acid.

As a suitable value for Y there may be mentioned, for example, a chlorine or bromine atom. The interaction may be carried out at ambient temperature or it may be accelerated or completed by the application of heat, for example by heating to a temperature of 90°–110°C.; it may be carried out at atmospheric or at an elevated pressure, for example by heating in a sealed vessel; and it may be carried out in an inert diluent or solvent, for example methanol or ethanol, or an excess of the amine of the formula $NH_2R^1$, wherein $R^1$ has the meaning stated above, may be used as diluent or solvent.

The starting material used in the above process may be obtained by the interaction of the corresponding phenol with an epihalohydrin, for example epichlorohydrin. The said starting material may be isolated or it may be prepared and used in situ without isolation.

According to a further feature of the invention we provide a process for the manufacture of the alkanolamine derivatives of the invention which comprises the interaction of a compound of the formula:

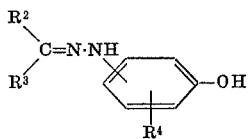

wherein $R^2$, $R^3$ and $R^4$ have the meanings stated above, with a compound of the formula:

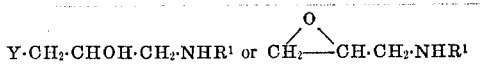

wherein $R^1$ and Y have the meanings stated above, whereafter if desired the product in free base form is converted into an acid-addition salt thereof by reaction with an acid.

The last-named interaction may conveniently be carried out in the presence of an acid-binding agent, for example sodium hydroxide. Alternatively, an alkali metal derivative of the phenol reactant, for example the sodium or potassium derivative, may be used as starting material. The interaction may be carried out in a diluent or solvent, for example methanol or ethanol, and it may be accelerated or completed by the application of heat, for example by heating to the boiling point of the diluent or solvent.

It is to be understood that a compound wherein at least one of $R^2$ and $R^3$ stands for a functional derivative of the carboxy radical may be converted into a different compound wherein at least one of $R^2$ and $R^3$ stands for a different functional derivative of the carboxy radical. Thus, for example, a compound wherein $R^2$ stands for the cyano radical may be hydrolysed to the corresponding compound wherein $R^2$ stands for the carbamoyl radical; or a compound wherein either or both of $R^2$ and $R^3$ stand(s) for an alkoxycarbonyl radical, for example the ethoxycarbonyl radical, may be converted into the corresponding compound wherein either or both of $R^2$ and $R^3$ stand(s) for the carbamoyl or carbazoyl radical, by interaction with ammonia or hydrazine respectively.

As stated above, the alkanolamine derivatives of the invention and the acid-addition salts thereof are of value in the treatment or prophylaxis of heart diseases. Furthermore, some of these compounds possess selective β-adrenergic blocking activity. Compounds exhibiting this selective action show a greater degree of specificity in blocking the cardiac β-receptors than the β-receptors in peripheral blood vessels and bronchial muscle. Thus, a dose may be selected for such a compound at which the compound blocks the cardiac inotropic and chronotropic actions of a catecholamine [for example isoprenaline, that is, 1-(3,4-dihydroxyphenyl)-2-isopropylaminoethanol] but does not block the relaxation of treacheal smooth muscle produced by isoprenaline or the peripheral vasodilator action of isoprenaline. Because of this selective action, one of these compounds may advantageously be used together with a sympathomimetic bronchodilator, for example isoprenaline, orciprenaline, adrenaline or ephedrine, in the treatment of asthma and other obstructive airways diseases, inasmuch as the selective compound will substantially inhibit the unwanted stimulatory effects of the bronchodilator on the heart but will not hinder the desirable therapeutic effect of the bronchodilator.

According to a further feature of the invention, therefore, we provide pharmaceutical compositions comprising as active ingredient one or more alkanolamine derivatives of the invention, or acid-addition salts thereof, in association with a pharmaceutically-acceptable diluent or carrier therefor.

As suitable compositions there may be mentioned, for example, tablets, capsules, aqueous or oily solutions or suspensions, emulsions, injectable aqueous or oily solutions or suspensions, and dispersible powders, sprays and aerosol formulations.

The pharmaceutical compositions of the invention may contain, in addition to the alkanolamine derivative of the invention or acid-addition salt thereof, one or more drugs selected from sedatives, for example phenobarbitone, meprobamate and chlorpromazine; vasodilators, for example glyceryl trinitrate, pentaerythritol tetranitrate and isosorbide dinitrate; diuretics, for example chlorothiazide; hypotensive agents, for example reserpine, bethanidine and guanethidine; myocardial depressants, for example quinidine; agents used in the treatment of Parkinson's disease, for example benzhexol; cardiotonic agents, for example digitalis preparations; and sympathomimetic bronchodilators, for example isoprenaline, orciprenaline, adrenaline and ephedrine.

It is expected that the alkanolamine derivatives would be given to man at a total oral dose of between 20 mg. and 600 mg. daily, at doses spaced at 6–8 hourly intervals, or at an intravenous dose of between 1 mg. and 20 mg. Preferred oral dosage forms are tablets or capsules containing between 10 and 100 mg., and preferably 10 mg. or 40 mg., of active ingredient. Preferred intravenous dosage forms are sterile aqueous solutions of the alkanolamine derivative or of a non-toxic acid-addition salt thereof, containing between 0.05% and 1% w/v of active ingredient, and more particularly containing 0.1% w/v of active ingredient.

The invention is illustrated but not limited by the following Examples:

EXAMPLE 1

A solution of 0.18 g. of sodium nitrite in 2 ml. of water is added to a solution of 0.5 g. of 1-(p-aminophenoxy)-3-isopropylaminopropan-2-ol in a mixture of 1.1 ml. of concentrated hydrochloric acid and 5 ml. of ice water. This clear diazonium solution is added dropwise during 5 minutes to a stirred mixture of 0.4 g. of diethyl malonate, 2.5 g. of anhydrous sodium acetate, 6 ml. of methylated spirit and 10 ml. of water which is maintained at 5°–10°C. The mixture is stirred for 2 hours and is then extracted with chloroform, and the chloroform extract is dried and evaporated to dryness under reduced pressure. The residual oil is triturated with petroleum ether, the petroleum ether is decanted and the solid residue is crystallized from a mixture of 2 volumes of benzene and 1 volume of cyclohexane. There is thus obtained 1-p-(α,α-bisethoxycarbonylmethylenehydrazino)phenoxy-3-isopropylaminopropan-2-ol acetate, m.p. 127°–129°C.

EXAMPLE 2

The process described in Example 1 is repeated except that an equivalent amount of 1-(p-aminophenoxy)-3-t-butylaminopropan-2-ol is used in place of the 1-(p-aminophenoxy)-3-isopropylaminopropan-2-ol. The residue after decanting the petroleum ether is chromatographed on an alumina column using methanol as eluant. The eluate is evaporated to dryness and the residual oil is again triturated with petroleum ether. The petroleum ether is decanted and there is thus obtained as residue 1-p-($\alpha,\alpha$-bisethoxycarbonylmethylenehydrazino)phenoxy-3-t-butylaminopropan-2-ol, containing 2 moles of water of crystallization per mole of base, m.p. 163°–164°C.

EXAMPLE 3

The process described in Example 1 is repeated except that an equivalent amount of ethyl cyanoacetate is used in place of the diethylmalonate, and also that after evaporation of the chloroform extract the residual oil is dissolved in acetone. The material that precipitates from this acetone solution is filtered off and crystallized from ethyl acetate, and there is thus obtained 1-p-($\alpha$-cyano-$\alpha$-ethoxycarbonylmethylenehydrazino)phenoxy-3-isopropylaminopropan-2-ol acetate, m.p. 150°–151°C.

EXAMPLE 4

The diazonium solution, prepared as described in Example 1, is added dropwise to a stirred solution of 0.16 g. of malononitrile, 2.5 g. of anhydrous sodium acetate, 7 ml. of methylated spirit and 7 ml. of ice water. The mixture is stirred for 20 minutes, dilute aqueous sodium hydroxide solution is added until the pH of the mixture is 7, and the mixture is filtered. The solid residue is crystallized from methylated spirit and there is thus obtained 1-p-($\alpha,\alpha$-dicyanomethylenehydrazino)phenoxy-3-isopropylaminopropan-2-ol, containing half a mole of water of crystallization per mole of base, m.p. 136°C. with decomposition (using a block preheated to 130°C.).

EXAMPLE 5

The diazonium solution, prepared as described in Example 1, is added dropwise to a stirred solution of 0.25 g. of acetylacetone, 2.5 g. of sodium carbonate and 15 ml. of ice water. The mixture is stirred for 20 minutes and is then extracted with chloroform, and the chloroform extract is dried and evaporated to dryness. The residue is crystallized from cyclohexane and there is thus obtained 1-p-($\alpha,\alpha$-diacetylmethylenehydrazino)phenoxy-3-isopropylaminopropan-2-ol, m.p. 117°–118°C.

EXAMPLE 6

A mixture of 0.4 g. of 1-p-($\alpha,\alpha$-dicyanomethylenehydrazino)phenoxy-3-isopropylaminopropan-2-ol and 1 ml. of concentrated aqueous hydrochloric acid is heated at 95°–100°C. for 15 minutes. The mixture is cooled, acetone is added and the mixture filtered. There is thus obtained as solid residue 1-p-($\alpha$-carbamoyl-$\alpha$-cyanomethylenehydrazino)phenoxy-3-isopropylaminopropan-2-ol hydrochloride, m.p. 220°–221°C. (with decomposition).

EXAMPLE 7

5 Ml. of 60% hydrazine hydrate are added to a warm solution of 2.1 g. of 1-p-($\alpha,\alpha$-bisethoxycarbonylmethylenehydrazino)phenoxy-3-isopropylaminopropan-2-ol acetate in 20 ml. of methylated spirit, and the mixture is heated under reflux for 30 minutes. The methylated spirit is removed by evaporation under reduced pressure and the solid residue is crystallized from methylated spirit. There is thus obtained 1-p-($\alpha,\alpha$-dicarbazoylmethylenehydrazino)-phenoxy-3-isopropylaminopropan-2-ol, m.p. 121°–123°C.

EXAMPLE 8

A solution of 0.24 g. of sodium nitrite in 2 ml. of water is added to a solution of 0.9 g. of 1-(4-amino-2-ethylphenoxy)-3-t-butylaminopropan-2-ol in a mixture of 1.4 ml. of concentrated aqueous hydrochloric acid and 10 ml. of ice water. This clear diazonium solution is added dropwise during 5 minutes to a stirred mixture of 0.5 g. of diethyl malonate, 3.3 g. of anhydrous sodium acetate, 10 ml. of methylated spirit and 15 ml. of water which is maintained at 5°–10°C. The pH of the solution is adjusted to between 8 and 9 with dilute aqueous sodium hydroxide solution, and the mixture is extracted with chloroform. The chloroform extract is dried and evaporated to dryness and the residual oil is chromatographed on an alumina column using methanol as eluant. The eluate is evaporated to dryness under reduced pressure and there is thus obtained 1-[4-($\alpha,\alpha$-bisethoxycarbonylmethylenehydrazino)-2-ethylphenyl]-3-t-butylaminopropan- 2-ol as an oil, the structure of which is confirmed by IR and NMR spectroscopy.

The 1-(4-amino-2-ethylphenoxy)-3-t-butylaminopropan-2-ol (m.p. 73°–74°C.) used as starting material may be obtained as described in Example 9 of the complete specification in United Kingdom Application No. 40961/67 (Dutch Specification No. 6812681).

EXAMPLE 9

The process described in Example 3 is repeated except that an equivalent amount of methyl acetoacetate is used in place of the ethyl cyanoacetate. There is thus obtained 1-p-($\alpha$-acetyl-$\alpha$-methyoxycarbonylmethylenehydrazino)phenoxy-3-isopropylaminopropan-2-ol acetate, m.p. 151°–152°C.

EXAMPLE 10

The process described in Example 3 is repeated except that an equivalent amount of 5,5-dimethylcyclohexane-1,3-dione is used in place of the ethyl cyanoacetate. There is thus obtained 1-p-(4,4-dimethyl-2,6-dioxocyclohexylidenehydrazino)phenoxy-3-isopropylaminopropan-2-ol acetate, m.p. 142°–146°C.

EXAMPLE 11

The process described in Example 1 is repeated except that an equivalent amount of t-butyl cyanoacetate is used in place of the diethyl malonate, and also that after the dried chloroform extract has been evaporated to dryness the residual oil is triturated with ether. The ether is decanted and there is thus obtained as solid residue 1-p-($\alpha$-cyano-$\alpha$-t-butoxycarbonylmethylenehydrazino)phenoxy-3-isopropylaminopropan-2-ol acetate hemihydrate, m.p. 120°–122°C. with decomposition (sample heated in a sealed tube).

EXAMPLE 12

The diazonium solution, prepared as described in Example 1, is added dropwise to a stirred solution of 0.19 g. of nitroethane and 0.23 g. of sodium in 10 ml. of methyl alcohol. The mixture is stirred for 15 minutes and is then extracted with chloroform, and the chloroform extract is dried and evaporated to dryness under reduced pressure. The residual oil is triturated with ether, the ether is decanted and the solid residue is crystallized from methylated spirit. There is thus obtained 1-p-(α-nitroethylidenehydrazino)phenoxy-3-isopropylaminopropan-2-ol hydrochloride, m.p. 153°C. with decomposition.

EXAMPLE 13

The process described in Example 1 is repeated except that an equivalent amount of 1-(p-aminophenoxy)-3-(2-hydroxy-1,1-dimethylethylamino)propan-2-ol (prepared as described in the complete specification in United Kingdom Application No. 33973/67) is used in place of the 1-(p-aminophenoxy-3-isopropylaminopropan-2-ol, and also that after the dried chloroform extract has been evaporated to dryness the residual oil is triturated with ether. The ether is decanted and the solid residue is crystallized from ethyl acetate. There is thus obtained 1-p-(α-cyano-α-ethoxycarbonylmethylene-hydrazino)phenoxy-3-(2-hydroxy-1,1-dimethylethylamino)propan-2-ol acetate, m.p. 148°C. with decomposition.

EXAMPLE 14

The process described in Example 3 is repeated except that an equivalent amount of benzoylacetone is used in place of the ethyl cyanoacetate. The material that precipitates from the acetone solution is filtered off and there is thus obtained as solid residue 1-p-(α-acetyl-α-benzoylmethylenehydrazino)phenoxy-3-isopropylaminopropan-2-ol acetate, m.p. 151°–152°C.

EXAMPLE 15

The process described in Example 1 is repeated except that an equivalent amount of 1-(4-amino-2-chlorophenoxy)-3-isopropylaminopropan-2-ol (prepared by a similar process to that described in Example 11 of the complete specification in United Kingdom Application No. 43927/67, Dutch Specification No. 6813616) is used in place of the 1-(p-aminophenoxy)-3-isopropylaminopropan-2-ol, and also that after the dried chloroform extract has been evaporated to dryness the residual oil is triturated with ether. The ether is decanted and the solid residue is crystallized from toluene. There is thus obtained 1-[2-chloro-4-(α-cyano-α-ethoxycarbonylmethylenehydrazino)phenoxy]3-isopropylaminopropan-2-ol acetate, m.p. 119°–121°C.

EXAMPLE 16

The process described in Example 1 is repeated except that an equivalent amount of ethyl carbamoylacetate is used in place of the diethyl malonate, and also that after the dried chloroform extract has been evaporated to dryness the residual oil is triturated with ether. The ether is decanted and the solid residue is crystallized from ethyl acetate. There is thus obtained 1-p-(α-carbamoyl-α-ethoxycarbonylmethylenehydrazino)phenoxy-3-isopropylaminopropan-2-ol acetate, m.p. 152°–154°C.

EXAMPLE 17

The process described in Example 1 is repeated except that an equivalent amount of methyl cyanoacetate is used in place of the diethyl malonate, and also that after the dried chloroform solution has been evaporated to dryness the residual oil is triturated with acetone and the mixture is filtered. There is thus obtained as solid residue 1-p-(α-cyano-α-methoxycarbonylmethylene-hydrazino)phenoxy-3-isopropylaminopropan-2-ol acetate, m.p. 149°–150°C. with decomposition.

EXAMPLE 18

A mixture of 1.2 g. of 1-p-(α,α-diacetylmethylenehydrazino)-phenoxy-2,3-epoxypropane and 15 ml. of isopropylamine is kept at room temperature for 17 hours and the excess of isopropylamine is removed by evaporation under reduced pressure. The residual oil is dissolved in chloroform and the mixture is extracted three times with 15 ml. of aqueous 2N-hydrochloric acid each time. The combined acidic extracts are basified to pH 10 with 10 percent aqueous sodium hydroxide solution and the mixture is extracted four times with 20 ml. of chloroform each time. The combined extracts are dried and evaporated to dryness, and the residue is purified by thick-layer chromatography on silica gel using 1 percent ammonium hydroxide in methanol as developing solvent to give 1-p-(α,α-diacetylmethylenehydrazino)phenoxy-3-isopropylaminopropan-2-ol identical with that prepared as described in Example 5.

The 1-p-(α,α-diacetylmethylenehydrazino)phenoxy-2,3-epoxypropane used as starting material may be obtained as follows:

A solution of 0.36 g. of sodium nitrite in 4 ml. of water is added to a solution of 0.54 g. of p-aminophenol in a mixture of 2.2 ml. of concentrated hydrochloric acid and 10 ml. of ice water. This clear diazonium solution is added dropwise during 5 minutes to a stirred mixture of 0.5 g. of acetylacetone, 5.0 g. of anhydrous sodium acetate, 14 ml. of methylated spirit and 14 ml. of water which is maintained at 5°–10°C. The mixture is stirred for 2 hours and then filtered, and the solid residue is washed with water and crystallized from β-ethoxyethanol. There is thus obtained p-(α,α-diacetylmethylenehydrazino)phenol, m.p. 250°C. with decomposition.

A mixture of 2.0 g. of p-(α,α-diacetylmethylenehydrazino)-phenol, 20 ml. of aqueous 0.5N-sodium hydroxide solution and 1 ml. of epichlorohydrin is stirred at room temperature for 16 hours and is then extracted with chloroform. The chloroform extract is dried and evaporated to dryness under reduced pressure. The residue consists of 1-p-(α,α-diacetylmethylenehydrazino)phenoxy-2,3-epoxypropane and is used without further purification.

EXAMPLE 19

The diazonium solution, prepared as described in Example 1, is added dropwise to a stirred cooled solution of 0.32 g. of barbituric acid in 20 ml. of water and 3.5 ml. of aqueous 5N-sodium carbonate solution. The mixture is stirred for 30 minutes and filtered, and the solid residue is washed with water and then with acetone, and finally is crystallized from water. There is thus obtained 1-p-(hexahydro-2,4,6-trioxopyrimidin-5-ylidenehydrazino)phenoxy-3-isopropylaminopropan-2-ol, m.p. 258°C. with decomposition.

What we claim is:

1. An alkanolamine derivative selected from compounds of the formula:

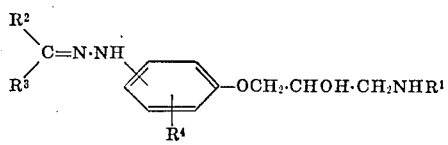

wherein $R^1$ is alkyl or hydroxyalkyl each of up to 12 carbon atoms or cycloalkyl of up to eight carbon atoms; wherein $R^2$ is alkyl of up to four carbon atoms, alkanoyl of up to six carbon atoms, aroyl of up to 10 carbon atoms, alkoxycarbonyl of up to six carbon atoms, or cyano, and wherein $R^3$ is cyano, and wherein $R^4$ is hydrogen, halogen, nitro or cyano, or alkyl of up to 4 carbon atoms, cycloalkyl of up to eight carbon atoms, alkenyl, acyl or alkoxycarbonyl each of up to six carbon atoms, alkylthio, alkoxy, alkenyloxy or alkynyloxy each of up to five carbon atoms, aryl, aryloxy, aralkyl or aralkoxy each of up to 10 carbon atoms or alkyl of up to five carbon atoms which is substituted by one or more substituents selected from hydroxy, alkoxy of up to four carbon atoms and halogen; and the acid-addition salts thereof.

2. An alkanolamine derivative as claimed in claim 1 wherein $R^1$ is alkyl or hydroxyalkyl of three, four or five carbon atoms which is branched at the α-carbon atom, or an acid-addition salt thereof.

3. An alkanolamine derivative as claimed in claim 1 wherein $R^1$ is isopropyl, s-butyl, t-butyl, 2-hydroxy-1,1-dimethylethyl, cyclopropyl, cyclobutyl or cyclopentyl; wherein $R^2$ is methyl, ethyl, acetyl, propionyl, benzoyl, p-toluoyl, cyano, methoxycarbonyl, ethoxycarbonyl, t-butoxycarbonyl, and wherein $R^3$ is cyano, and wherein $R^4$ is hydrogen, fluorine, chlorine, bromine, iodine, methyl, ethyl, cyclopropyl, cyclobutyl, cyclopentyl, allyl, nitro, methylthio, methoxy, isopropoxy, allyloxy, propargyloxy, phenyl, phenoxy, benzyl, α-phenylethyl, benzyloxy, hydroxymethyl, methoxymethyl, trifluoromethyl, acetyl, propionyl, methoxycarbonyl, ethoxycarbonyl or cyano; or an acid-addition salt thereof.

4. An acid-addition salt as claimed in claim 1 which is a hydrochloride, hydrobromide, phosphate, sulphates, oxalate, lactate, tartrate, acetate, salicylate, citrate, benzoate, α-naphthoate, adipate or 1,1-methylene-bis-(2-hydroxy-3-naphthoate).

5. An alkanolamine derivative selected from compounds of the formula:

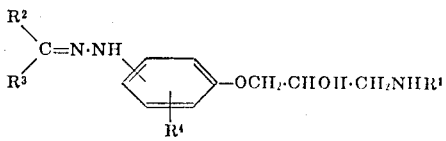

wherein $R^1$, $R^2$, $R^3$ and $R^4$ have the meanings stated in claim 1, and the acid-addition salts thereof.

6. An alkanolamine derivative as claimed in claim 5 wherein $R^1$ is isopropyl, s-butyl, t-butyl or 2-hydroxy-1,1-dimethylethyl, wherein $R^2$ is acetyl, cyano, or alkoxycarbonyl of up to 6 carbon atoms, wherein $R^3$ is cyano, and wherein $R^4$ is hydrogen, chlorine or ethyl, or an acid-addition salt thereof.

7. A compound as claimed in claim 1 selected from 1-p-(α,α-dicyanomethylene-hydrazino)phenoxy-3-isopropylaminopropan-2-ol and the acid-addition salts thereof.

8. A compound as claimed in claim 1 selected from 1-p-(α-cyano-α-t-butoxycarbonyl-methylenehydrazino)phenoxy-3-isopropylamino-propan-2-ol and the acid-addition salts thereof.

9. A compound as claimed in claim 1 selected from 1-p-(α-cyano-α-ethoxycarbonylmethylene-hydrazino)phenoxy-3-(2-hydroxy-1,1-dimethylethylamino)propan-2-ol and the acid-addition salts thereof.

10. A compound as claimed in claim 1 selected from 1-[2-chloro-4-(α-cyano-α-ethoxycarbonyl-methylenehydrazino)phenoxy]-3-isopropylaminopropan-2-ol and the acid-addition salts thereof.

11. A compound as claimed in claim 1 selected from 1-p-(α-cyano-α-methoxycarbonyl-methylenehydrazino)phenoxy-3-isopropylamino-propan-2-ol and the acid-addition salts thereof.

12. An alkanolamine derivative as claimed in claim 1, said derivative being 1-p-(α-cyano-α-ethoxycarbon-ylmethylenehydrazino)-phenoxy-3-isopropylaminopropan-2-ol or an acid-addition salt thereof.

* * * * *